June 8, 1926.
W. C. STEVENS
TIRE TESTING MACHINE
Filed April 23, 1924   3 Sheets-Sheet 3
1,588,343
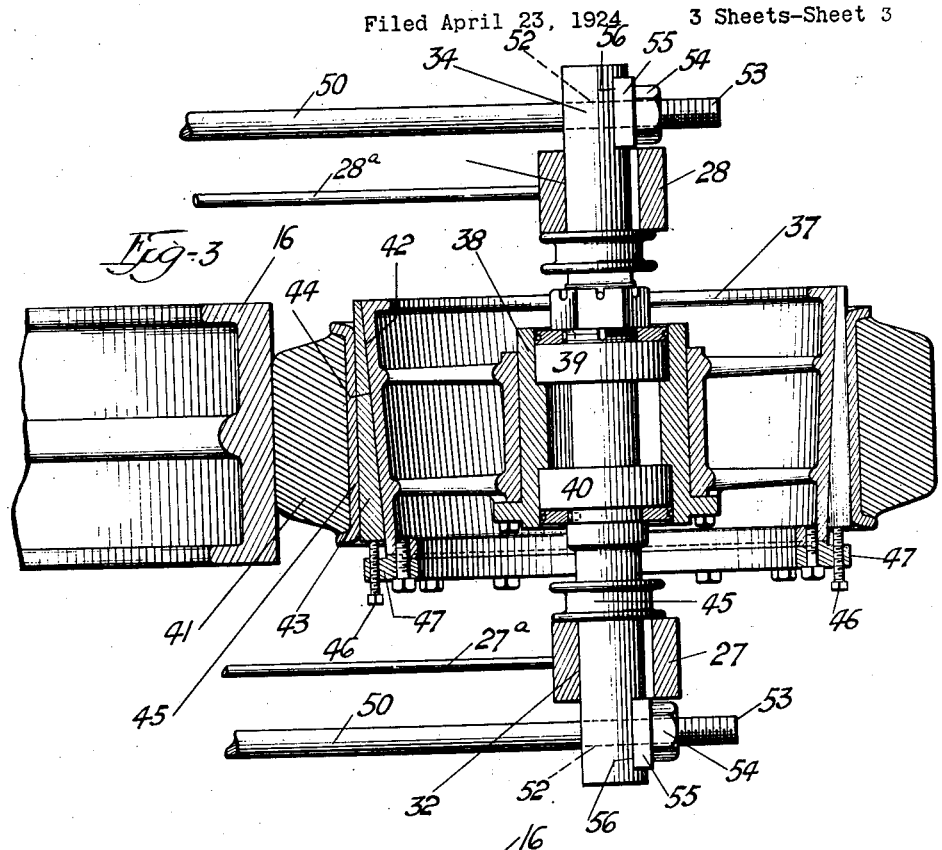
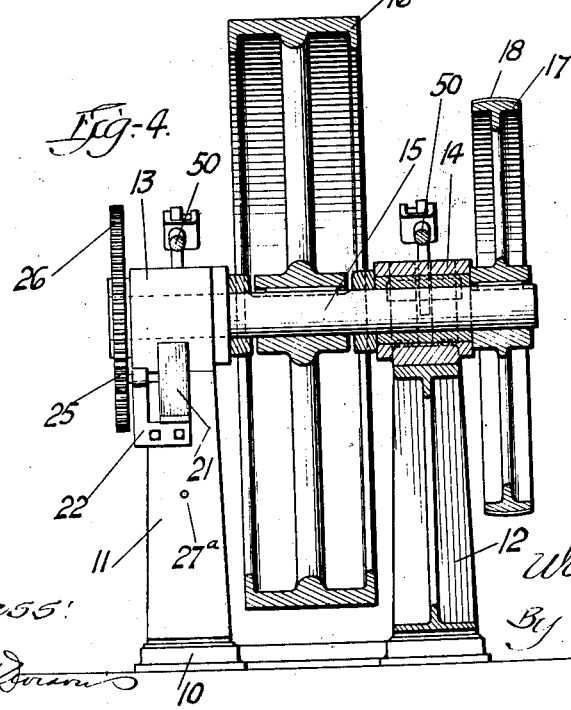
Inventor:
William C. Stevens
By
Atty.
Witness:

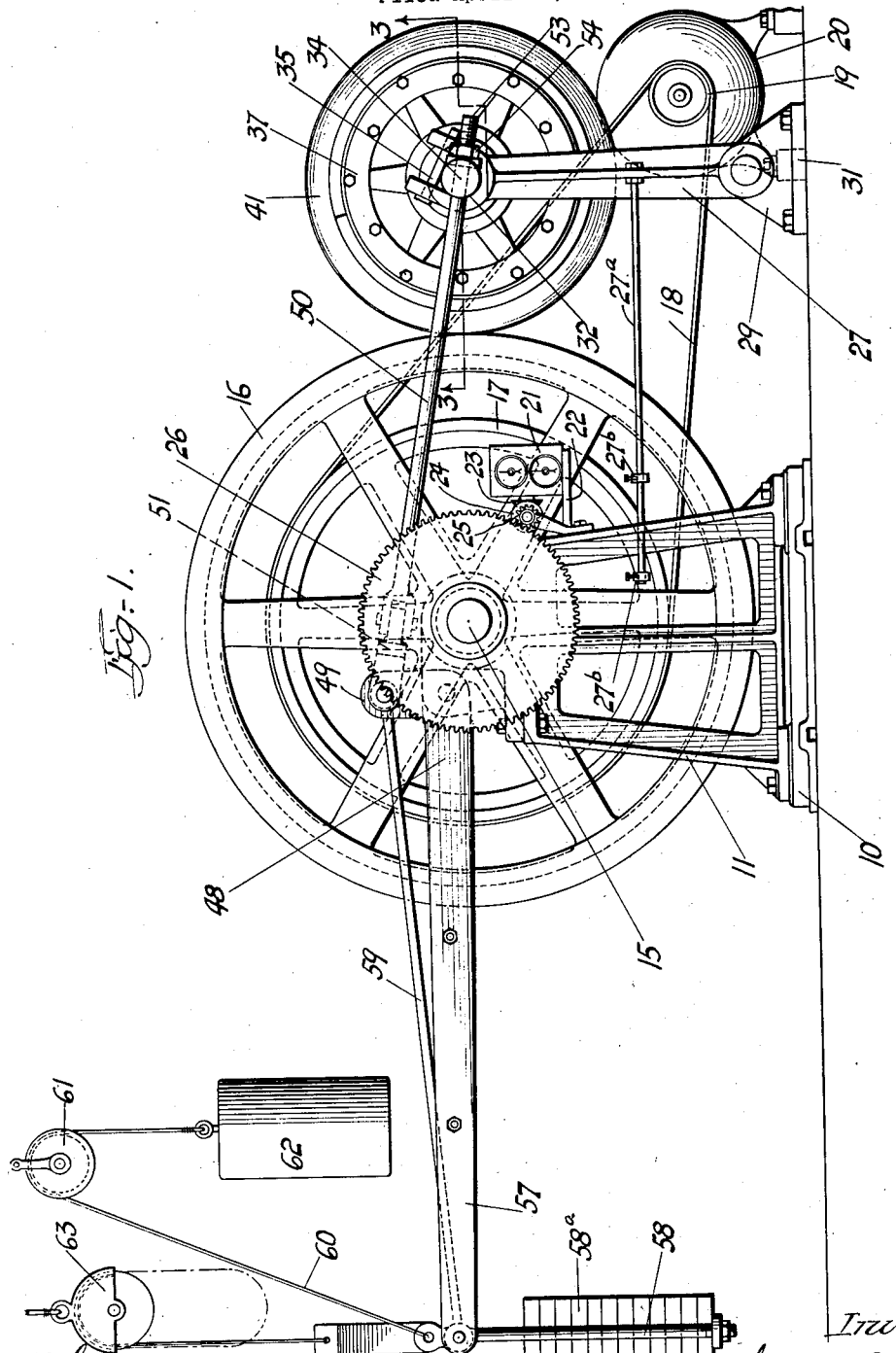

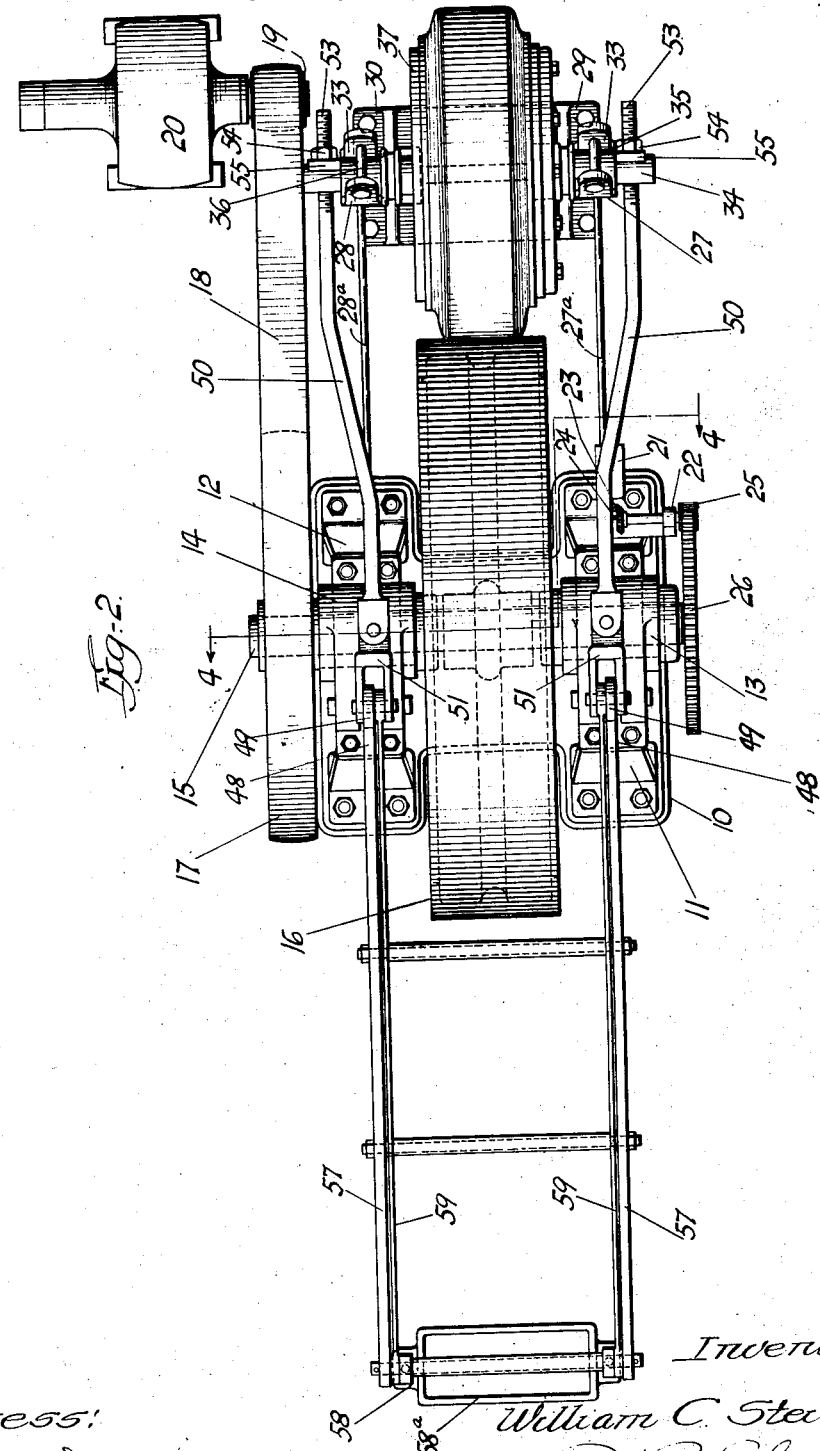

Patented June 8, 1926.

1,588,343

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-TESTING MACHINE.

Application filed April 23, 1924. Serial No. 708,419.

This invention relates to tire-testing machines and especially to machines for testing solid or cushion tires of rubber.

It is the purpose of the invention, in general, to provide an improved tire-testing machine which is simple in construction and easy to operate. More specifically, the objects of the invention are to provide an improved mount especially adapted for rotatably supporting tires and for movement toward and from a drum against which the periphery of the tire is to be pressed, to provide means acting on said mount to hold the tire under a known load against the drum, to adapt the above mentioned means to be gravity actuated, and to so mount said means with respect to the drum that a minimum of space is required in which the machine may be installed.

Other objects will appear when the following description is read in connection with the accompanying drawings in which the invention is illustrated in its preferred form, it being understood that the appended claims are not wholly limited to the specific construction illustrated.

Of the accompanying drawings:

Figure 1 is a side elevation of a machine embodying the invention;

Figure 2 is a plan thereof;

Figure 3 is an enlarged section on line 3—3 of Figure 1; and

Figure 4 is a section on line 4—4 of Figure 2.

Referring to the drawings, 10 represents a suitable base on which are mounted brackets 11 and 12 adapted respectively for supporting bearings 13 and 14 in which is journaled a shaft 15 on which is keyed or otherwise secured a drum 16. The drum 16, against which a tire to be tested is pressed as will be understood may be driven by a pulley 17 also keyed onto the shaft 15, over which pulley is trained a belt 18, which is driven by a pulley 19 on the shaft of a motor 20. For indicating the speed of a tire relatively to the surface of the drum during a testing operation, a speedometer 21 is arranged on a bracket 22 secured to the bracket 11 and is adapted to be operated by a bevel gear 23 meshing with a bevel gear 24 journaled in the bracket 22 and driven by a pinion 25 which in turn is driven by a gear 26 secured on the shaft 15.

For supporting a tire to be tested in such a manner that it will be movable toward and from the drum 16, there is provided a pair of levers 27 and 28 respectively pivoted on brackets 29 and 30 mounted on a base plate 31 spaced the required distance to one side (the right side, as shown in Figure 1) of the base plate 10. For limiting the pivotal movement of levers 27 and 28, rods 27$^a$ and 28$^a$ are connected thereto and extend through apertures in the brackets 11 and 12, adjustable stops 27$^b$ and 28$^b$ being secured on the rods. The levers 27 and 28 have formed respectively on their upper ends, U-shaped bearings 32 and 33 adapted removably to support a shaft 34 which is retained in the bearings respectively by pins 35 and 36.

Referring especially to Figure 3, the shaft 34 is adapted removably to receive a tire-carrying drum 37 which is supported by a hub member 38, journaled onto suitable roller bearings 39 and 40 mounted on shaft 34. The drum 37 is adapted removably to receive a solid tire, indicated at 41, the drum 37 being formed with a conical surface 42 on which is slidably seated a transversely split ring 43 having an inner, conical surface 44 and an outer, transversely flat, tire rim seating surface 45. For sliding the ring 43 laterally on the drum 42 so as to tightly grip the rim of the tire 41, there is provided a series of cap screws 46, 46 screw threadedly engaged in apertures in an annulus 47 bolted onto the edge of the drum 42 of smallest diameter.

The mechanism for urging the tire 41 under a determinate load against the surface of drum 16 comprises bell-crank levers, 48, 48 pivoted adjacent bearings 13 and 14 and having short arms 49, 49, releasably connected by pull rods 50, 50 to shaft 34. The rods 50 are connected to the arms 49 by universal joints 51, 51 and are of such length as to extend through apertures 52, 52 in shaft 34, the ends of the rods being threaded at 53, 53 so as to be adapted to receive nuts 54, 54 for holding apertured blocks 55, 55 slidably received on the rods 50, in squared recesses 56, 56 formed in the shaft 34. The other arms 57, 57 of the bell-crank levers 48 are of great length, for example ten times as long as the arms 49, and have secured on their ends a suitable weight hanger 58 adapted to receive weights 58$^a$, 58$^a$. Tie rods 59, 59 extend from the ends of arms 50 to the ends of arms 57 so as to strengthen the structure. For balancing the unbalanced weight of the lever system thus formed, a cable 60 is attached to arms 57 and extends over a pulley 61 so as to support a counter weight 62. For raising and lowering the arms 57 a suitable chain hoist 63 may be connected thereto.

In operation, levers 27 and 28 are swung back from the position shown in Figure 1, pins 35 and 36 are removed and a previously tested tire on the drum 37 is removed by lifting shaft 34 from its bearings 32 and 33. The tire is removed from the drum 37 by releasing cap screws 46 and sliding the ring 43 toward the annulus 47. A new tire to be tested is mounted, as will be understood, on the drum 37 and the latter is again mounted on the levers 27 and 28. Blocks 55 are seated in the recesses 56 in shaft 34, and arms 57, which have in the meantime been raised by chain hoist 53, are lowered so that weights 58ª thereon are effective to force tire 41 against drum 16 under a known load, which in the instant case would be ten times the amount of the weights since the unbalanced weight of the system is balanced by counter weight 62.

Power is now supplied to motor 20, this power being regulated so as to impart the desired speed, say 25 miles per hour, to the drum 16. The tire is "run" on the drum surface until it wears down any determinate distance or until some fault in its construction appears, the mileage of the tire on the drum either being computed from the speed, or more accurately being measured by a suitable mileage indicator in contact with the drum surface. The tire may then be removed, as described, and the operations be repeated on other tires as will be understood.

Modifications of the invention may be resorted to without departing from the spirit or scope of the invention as claimed in the appended claims.

I claim:

1. A tire-testing machine comprising a rotary drum, a tire-carrying device pivoted adjacent said drum, a bell-crank lever pivotally mounted adjacent the center of said drum, a link releasably connecting one arm of said lever with said tire-carrying device, and means effective on the other arm of said lever to urge said device toward said drum.

2. A tire-testing machine comprising a rotary drum, a tire-carrying device movable toward and from said drum, a bell-crank lever pivotally mounted adjacent the bearings for said drum and having a comparatively short substantially vertical arm and a comparatively long substantially horizontal arm, a link connecting said short arm to said device, and means effective on said long arm to urge said device toward the surface of said drum.

3. A tire-testing machine comprising a rotary drum, a tire-carrying device pivoted adjacent said drum, a bell-crank lever pivotally mounted adjacent the center of said drum and having a comparatively short substantially vertical arm and a comparatively long substantially horizontal arm, a link releasably connecting said short arm to said device, and means effective on said long arm to urge said device toward said drum.

4. A tire-testing machine comprising a rotary drum, a pair of pivoted supports adjacent the drum and adapted removably to receive a shaft, a pair of pull rods adapted to be releasably connected to said shaft adjacent its ends and means for operating said pull rods so as to urge said shaft toward said drum.

5. A tire-testing machine comprising a rotary drum, a pair of pivoted supports adjacent the drum and adapted removably to receive a shaft for carrying a tire, a pair of pull rods adapted to be releasably connected to said shaft adjacent its ends, a pair of arms one pivoted on each side of said drum adjacent the center thereof and respectively connected to said pull rods and a second pair of arms secured to said first pair and adapted to be urged downwardly by gravity so as to urge said supports toward said drum.

6. A tire-testing machine comprising a rotary drum, a device for carrying a tire movable toward and from said drum, and a lever system straddling said drum for operating said device, and a connection between the device and one member of the system.

7. A tire-testing machine comprising a rotary drum, a device for carrying a tire movable toward and from said drum, and a lever system straddling and fulcrumed adjacent the center of said drum for operating said device, and a connection between the device and one member of the system.

8. A tire-testing machine comprising a rotary drum, a tire-carrying device movable toward and from the drum on one side thereof, means for urging said device toward said drum under determinate pressure, said means being arranged on the other side of the center of said drum, and a connection extending between said means and said device.

WILLIAM C. STEVENS.